(12) United States Patent
Vandyke et al.

(10) Patent No.: US 11,190,864 B1
(45) Date of Patent: Nov. 30, 2021

(54) SPEAKER UNIT FOR HEAD-MOUNTABLE DEVICE

(71) Applicant: Apple Inc., Cupertino, CA (US)

(72) Inventors: James W. Vandyke, San Francisco, CA (US); Darshan R. Kasar, San Francisco, CA (US); Neal D. Evans, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/174,222

(22) Filed: Feb. 11, 2021

Related U.S. Application Data

(60) Provisional application No. 62/991,517, filed on Mar. 18, 2020.

(51) Int. Cl.
*H04R 1/02* (2006.01)
*G02B 27/01* (2006.01)

(52) U.S. Cl.
CPC ......... *H04R 1/026* (2013.01); *G02B 27/0176* (2013.01); *H04R 1/025* (2013.01); *H04R 1/028* (2013.01)

(58) Field of Classification Search
CPC ........ H04R 1/026; H04R 1/025; H04R 1/028; G02B 27/0176
See application file for complete search history.

(56) References Cited

U.S. PATENT DOCUMENTS

| | | | |
|---|---|---|---|
| 9,456,284 | B2 | 9/2016 | Morishita et al. |
| 2016/0041392 | A1* | 2/2016 | Sundquist ........... G02B 27/0172 345/8 |
| 2017/0085992 | A1 | 3/2017 | Vitt et al. |
| 2019/0387299 | A1 | 12/2019 | Evans et al. |

\* cited by examiner

*Primary Examiner* — Andrew L Sniezek
(74) *Attorney, Agent, or Firm* — Morgan, Lewis & Bockius LLP (57) ABSTRACT

A head-mountable device can include a speaker unit that provides structural support to its own components and electrical connections between other components. The arrangement of conductive strips within a back plate of a speaker unit can provide the structural support needed by the components of a speaker while allowing components on opposing sides of the speaker unit to be operably connected to each other. By providing both functions with the conductive strips of a back plate, the total space required is minimized so that the head-securement element (e.g., band) of the head-mountable device maintains a thin profile.

20 Claims, 3 Drawing Sheets

SPEAKER UNIT FOR HEAD-MOUNTABLE DEVICE

CROSS-REFERENCE TO RELATED APPLICATION

This application claims the benefit of U.S. Provisional Application No. 62/991,517, entitled "SPEAKER UNIT FOR HEAD-MOUNTABLE DEVICE," filed Mar. 18, 2020, the entirety of which is incorporated herein by reference.

TECHNICAL FIELD

The present description relates generally to head-mountable devices, and, more particularly, to head-mountable devices with speaker units that provide interconnect capabilities.

BACKGROUND

A head-mountable device can be worn by a user to display visual information within the field-of-view of the user. The head-mountable device can be used as a virtual reality (VR) system, an augmented reality (AR) system, and/or a mixed reality (MR) system. A user may observe outputs provided by the head-mountable device, such as visual information provided on a display. The display can optionally allow a user to observe an environment outside of the head-mountable device. Other outputs provided by the head-mountable device can include speaker output and/or haptic feedback. A user may further interact with the head-mountable device by providing inputs for processing by one or more components of the head-mountable device. For example, the user can provide tactile inputs, voice commands, and other inputs while the device is mounted to the user's head.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Head-mountable devices, such as head-mountable displays, headsets, visors, smartglasses, head-up display, etc., can perform a range of functions that are managed by the components (e.g., sensors, circuitry, and other hardware) included with the wearable device. A head-mountable device can capture various types of inputs (e.g., visual, audio, tactile, etc.) from an environment and/or the user. A head-mountable device can also provide various types of outputs (e.g., visual, audio, tactile, etc.) to a user and/or the environment.

It can be desirable to minimize the space and weight requirements of a head-mountable device to enhance a user's comfort while wearing and operating the head-mountable device. Some components can be placed in front of the user to provide certain functions, such as providing a visual output or eye-sensing capabilities. However, other components may be distributed along other regions of the head-mountable device, including a head-securing element (e.g., band) that secures the display unit to a head of the user. A speaker unit may be positioned near an ear of the user to provide audio output. In addition, the structural components of the speaker unit can provide operable connections between other components that are on opposite sides of the speaker unit.

Systems of the present disclosure can include a head-mountable device with a speaker unit that provides structural support to its own components and electrical connections between other components. The arrangement of conductive strips within a back plate of a speaker unit can provide the structural support needed by the components of a speaker while allowing components on opposing sides of the speaker unit to be operably connected to each other. By providing both functions with the conductive strips of a back plate, the total space required is minimized so that the head-securement element (e.g., band) of the head-mountable device maintains a thin profile.

These and other embodiments are discussed below with reference to FIGS. 1-4. However, those skilled in the art will readily appreciate that the detailed description given herein with respect to these Figures is for explanatory purposes only and should not be construed as limiting.

Figure 1:
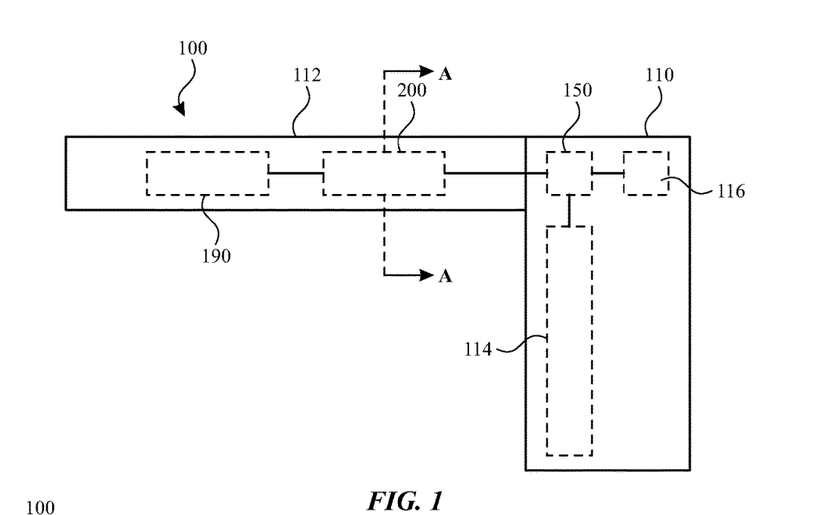
FIG. 1 illustrates a side view of a head-mountable device, according to some embodiments of the present disclosure.

According to some embodiments, for example as shown in FIG. 1, a head-mountable device 100 includes a display unit 110 that is worn on a head of a user. The display unit 110 can be positioned in front of the eyes of a user to provide information within a field-of-view of the user. The display unit 110 can provide nose pads or another feature to rest on a user's nose. The display unit 110 can be supported on a user's head with the head-securement element 112. The head-securement element 112 can wrap or extend along opposing sides of a user's head. The head-securement element 112 can include one or more bands for wrapping around the rear of a user's head. The head-securement element 112 can include earpieces for wrapping around or otherwise engaging or resting on a user's ears. It will be appreciated that other configurations can be applied for securing the head-mountable device 100 to a user's head. For example, one or more straps, belts, caps, hats, or other components can be used in addition to or in place of the illustrated components of the head-mountable device 100. By further example, the head-securement element 112 can include multiple components to engage a user's head.

The display unit 110 can provide structure around a peripheral region thereof to support any internal components of the display unit 110 in their assembled position. For example, the display unit 110 can enclose and support various internal components (including for example integrated circuit chips, processors, memory devices and other circuitry) to provide computing and functional operations for the head-mountable device 100, as discussed further herein. Any number of components can be included within and/or on the display unit 110 and/or the head-securement element 112.

The head-mountable device 100 can include one or more speaker units 200. The term "speaker units" refers to an audio output device or a set of audio output devices to be positioned in close proximity to the user's ear or ears. Where multiple speakers are provided, the speakers can be directed to each of a user's ears to provide stereo sound. Other speaker arrangements are contemplated, including surround sound. Additionally or alternatively, the head-mountable device 100 can be operably connected to speakers that are directed to, near, or in a user's ears. The speaker units 200 may also be referred to as a headphone, headphones, an earphone, or earphones. As shown, the one or more speaker units 200 can be positioned at a location along the head-securement element 112. The speaker units 200 are, for example, coupled to the head-securement element 112 in proximity to ears of the user for directing sound thereto.

The display unit 110 can include and/or support a display screen 114 that provides visual output for viewing by a user wearing the head-mountable device 100. For example, one or more optical modules can each provide a display screen 114 that is positioned on an inner side of the display unit 110. As used herein, an inner side of a portion of a head-mountable device is a side that faces toward the user and/or away from the external environment. For example, a pair of optical modules can be provided, where each optical module is movably positioned to be within the field-of-view of each of a user's two eyes. Each optical module can be adjusted to align with a corresponding eye of the user. For example, each optical module can be moved along one or more axes until a center of each optical module is aligned with a center of the corresponding eye. Accordingly, the distance between the optical modules can be set based on an interpupillary distance of the user.

The display unit 110 can include and/or support one or more cameras 116. The cameras 116 can be positioned on or near an outer side of the display unit 110 to capture images of views external to the head-mountable device 100. As used herein, an outer side of a portion of a head-mountable device is a side that faces away from the user and/or towards an external environment. The captured images can be visually output by the display screen 114 to the user and/or stored for any other purpose. Accordingly, the display screen 114 is able to accurately reproduce, simulate, or augment a view based on a view captured by the camera 116.

The display screen 114 and accompanying components can transmit light from a physical environment (e.g., as captured by the camera 116) for viewing by the user. Such a display screen 114 and/or accompanying components can include optical properties, such as lenses for vision correction based on incoming light from the physical environment. Additionally or alternatively, a display screen 114 can provide information within a field-of-view of the user. Such information can be provided to the exclusion of a view of a physical environment or in addition to (e.g., overlaid with) a physical environment.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations, (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different from the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

As further shown in FIG. 1, the controller 150 and/or other components of the display unit 110 can be operably connected to one or more components 190 in the head-securement element 112. The speaker unit 200 can be configured provide mechanical, electrical, and/or data connections between one or more components of the display unit 110 and one or more band components 190 of the head-securement element 112. Such connections can be integrated into the support structure of the speaker unit 200 and independent of connections used to operate the speaker unit 200, as discussed further herein.

Figure 2:
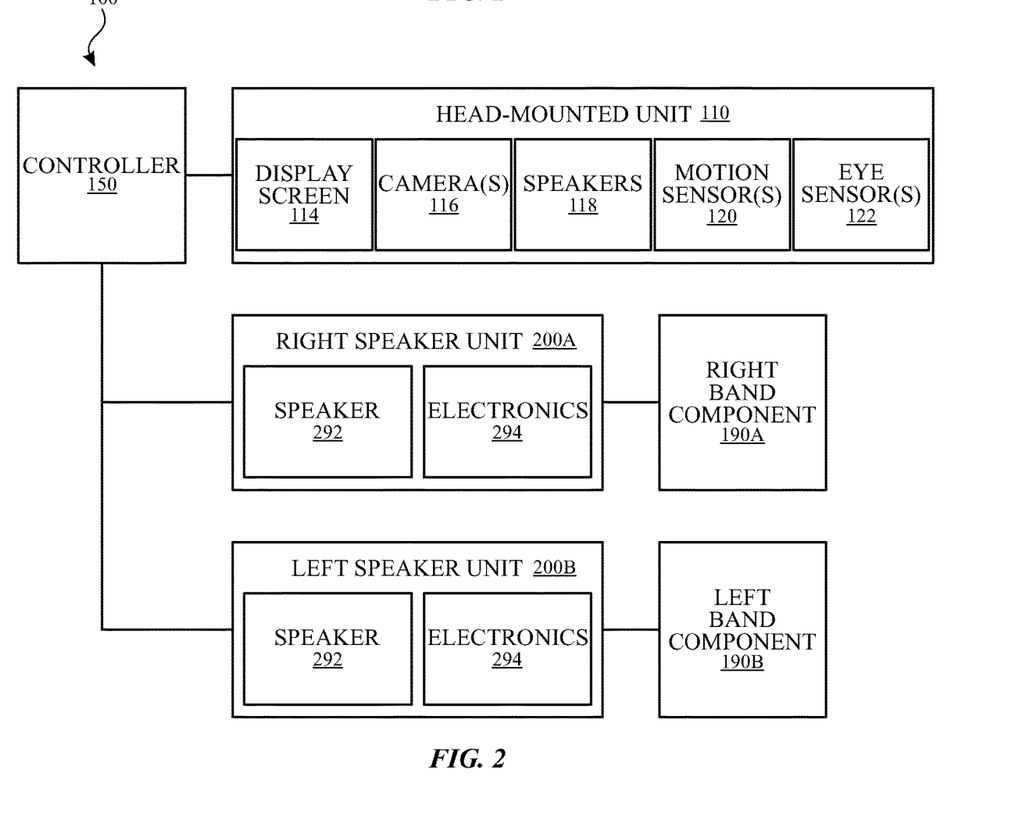
FIG. 2 illustrates a block diagram of a head-mountable device, in accordance with some embodiments of the present disclosure.

Referring now to FIG. 2, components of the head-mountable device can be operably connected to provide the performance described herein. FIG. 2 shows a simplified block diagram of an illustrative head-mountable device 100 in accordance with one embodiment of the invention. It will be appreciated that components described herein can be provided on either or both of a frame and/or a securement element of the head-mountable device 100. It will be understood that additional components, different components, or fewer components than those illustrated may be utilized within the scope of the subject disclosure.

As shown in FIG. 2, the head-mountable device 100 can include a controller 150 with one or more processing units that include or are configured to access a memory having instructions stored thereon. The instructions or computer programs may be configured to perform one or more of the operations or functions described with respect to the head-mountable device 100. The controller 150 can be implemented as any electronic device capable of processing, receiving, or transmitting data or instructions. For example, the controller 150 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

The memory can store electronic data that can be used by the head-mountable device 100. For example, the memory can store electrical data or content such as, for example, audio and video files, documents and applications, device settings and user preferences, timing and control signals or data for the various modules, data structures or databases, and so on. The memory can be configured as any type of memory. By way of example only, the memory can be implemented as random access memory, read-only memory, Flash memory, removable memory, or other types of storage elements, or combinations of such devices.

The head-mountable device 100 can further include a display screen 114 for displaying visual information for a user. The display screen 114 can provide visual (e.g., image or video) output. The display screen 114 can be or include an opaque, transparent, and/or translucent display. The display screen 114 may have a transparent or translucent medium through which light representative of images is directed to a user's eyes. The display screen 114 may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. The head-mountable device 100 can include an optical subassembly configured to help optically adjust and correctly project the image-based content being displayed by the display screen 114 for close up viewing. The optical subassembly can include one or more lenses, mirrors, or other optical devices.

The head-mountable device 100 can include a camera 116 for capturing a view of an environment external to the head-mountable device 100. The camera 116 can include an optical sensor, such as a photodiode or a photodiode array. Additionally or alternatively, the camera 116 can include one or more of various types of optical sensors that are arranged in various configurations for detecting user inputs described herein. The camera 116 may be configured to capture an image of a scene or subject located within a field-of-view of the camera 116. The image may be stored in a digital file in accordance with any one of a number of digital formats. In some embodiments, the head-mountable device 100 includes a camera, which includes an image sensor formed from a charge-coupled device (CCD) and/or a complementary metal-oxide-semiconductor (CMOS) device, a photovoltaic cell, a photo resistive component, a laser scanner, and the like. It will be recognized that a camera can include other motion sensing devices.

The display unit 110 may optionally include speakers 118, which transmit or output aural content to ears of the user, in addition to or in place of the speaker units 200.

The display unit may also include various sensors that detect conditions pertaining to the user, the display unit 110, and/or the head-securement element. For example, in addition to the camera 116, the display unit 110 may include motion sensors 120, such as one or more of accelerometers, gyroscopes, magnetometers, inertial measurement units (IMU), cameras, or the like, which measure conditions pertaining to the position and/or orientation of the head of the user, the display unit 110, and/or the head-securement element.

The head-mountable device 100 can include one or more eye sensors 122 for tracking features of the user wearing the head-mountable device 100, including conditions of the user's eye (e.g., focal distance, pupil size, etc.). For example, such sensors can perform facial feature detection, facial movement detection, facial recognition, eye tracking, user mood detection, user emotion detection, voice detection, etc. For example, an eye sensor can optically capture a view of an eye (e.g., pupil) and determine a direction of a gaze of the user. Such eye tracking may be used to determine a location and/or direction of interest. Detection and/or amplification of sound can then be focused if it is received from sources at such a location and/or along such a direction.

The head-mountable device 100 can include a battery, which can charge and/or power components of the head-mountable device 100. The battery can also charge and/or power components connected to the head-mountable device 100.

The head-mountable device 100 can include an input/output component, which can include any suitable component for connecting head-mountable device 100 to other devices. Suitable components can include, for example, audio/video jacks, data connectors, or any additional or alternative input/output components. The input/output component can include buttons, keys, or another feature that can act as a keyboard for operation by the user. As such, the description herein relating to keyboards can apply to keyboards, keys, and/or other input features integrated on the head-mountable device 100. Such an input/output component can be fixedly or removably attached to a display unit of the head-mountable device 100.

The head-mountable device 100 can include communications circuitry for communicating with one or more servers or other devices using any suitable communications protocol. For example, communications circuitry can support Wi-Fi (e.g., a 802.11 protocol), Ethernet, Bluetooth, high frequency systems (e.g., 900 MHz, 2.4 GHz, and 5.6 GHz communication systems), infrared, TCP/IP (e.g., any of the protocols used in each of the TCP/IP layers), HTTP, BitTorrent, FTP, RTP, RTSP, SSH, any other communications protocol, or any combination thereof. Communications circuitry can also include an antenna for transmitting and receiving electromagnetic signals.

The head-mountable device 100 can include the microphones. The microphones can be operably connected to the controller 150 for detection of sound levels and communication of detections for further processing.

The head-mountable device 100 can include one or more other sensors. Such sensors can be configured to sense substantially any type of characteristic such as, but not limited to, images, pressure, light, touch, force, temperature, position, motion, and so on. For example, the sensor can be a photodetector, a temperature sensor, a light or optical sensor, an atmospheric pressure sensor, a humidity sensor, a magnet, a gyroscope, an accelerometer, a chemical sensor, an ozone sensor, a particulate count sensor, and so on. By further example, the sensor can be a bio-sensor for tracking biometric characteristics, such as health and activity metrics. Other user sensors can perform facial feature detection, facial movement detection, facial recognition, eye tracking, user mood detection, user emotion detection, voice detection, etc.

Where the head-mountable device 100 includes multiple speaker units, one of the speaker units can be a right speaker unit 200A that his positionable near a right ear of the user, and another of the speaker units can be a left speaker unit 200B that his positionable near a left ear of the user. Each of the right speaker unit 200A and the left speaker unit 200B can include the same or similar components and be independently controlled to deliver sound to the corresponding ear.

Each of the right speaker unit 200A and the left speaker unit 200B can include a speaker 292 and electronics 294 for operating the speaker 292. For example, the electronics 294 can include an amplifier, power electronics, signal electronics, sensing electronics, and/or ambient sound electronics. The amplifier is configured to drive the speaker 292 for outputting the sound. The signal electronics are configured to receive and/or send signals to and/or from the display unit 110 or another component, such as a controller 150. The signal electronics may, for example, include communications interfaces to send and/or receive signals, such as via wireless, conductive, or optical connections. Such signals may, for example, include audio signals received for outputting the aural content and/or sensing signals for providing sensing information (e.g., position). The electronics 294 can be positioned within the housing of the corresponding speaker unit and/or another location, such as within the display unit 110.

As further shown in FIG. 2, the controller and/or another component of the display unit can be operably connected to one or more band components of the head-securement element via the one or more speaker units. The controller 150 and/or another component of the display unit 110 can be operably connected to a right band component 190A via the right speaker unit 200A and/or a left band component 190B via the left speaker unit 200B. The connection can be independent of a connection between the controller 150 and/or another component of the display unit 110 and the electronics 294 of the corresponding speaker unit.

It will be understood that any one of the components of the head-mountable device 100 described herein can be positioned within the display unit 110 and/or the head-securement element 112. Some components can be positioned at a given location to provide functionality at or from that location when worn by a user.

For example, some components can be positioned at the head-securement element 112 to provide a counter-balance to the weight of the display unit 110. One or more components, such as the battery described herein, can be positioned at the head-securement element 112 to distribute the weight thereof away from the display unit 110.

By further example, some components can be positioned at the head-securement element 112 to provide sensor capabilities at the sides and/or back of the user's head. One or more components, such as one or more of the sensors described herein, can be positioned at the head-securement element 112 to sense one or more of the conditions described herein at the corresponding location while the head-mountable device 100 is worn by a user. Such sensors can include biosensors for measuring conditions of a user and/or environmental sensors (e.g., camera, microphone, etc.) for measuring conditions of an environment about the user.

By further example, some components can be positioned at the head-securement element 112 to occupy space beyond the limits of the display unit 110. One or more components, such as the antenna described herein, can be positioned at the head-securement element 112 to provide communication capabilities across a broad area.

It will be understood that any component within the head-securement element 112 can be operably connected to any component within the display unit 110 via a conductive pathway provided by a speaker unit 200, as discussed further herein.

Figure 3:
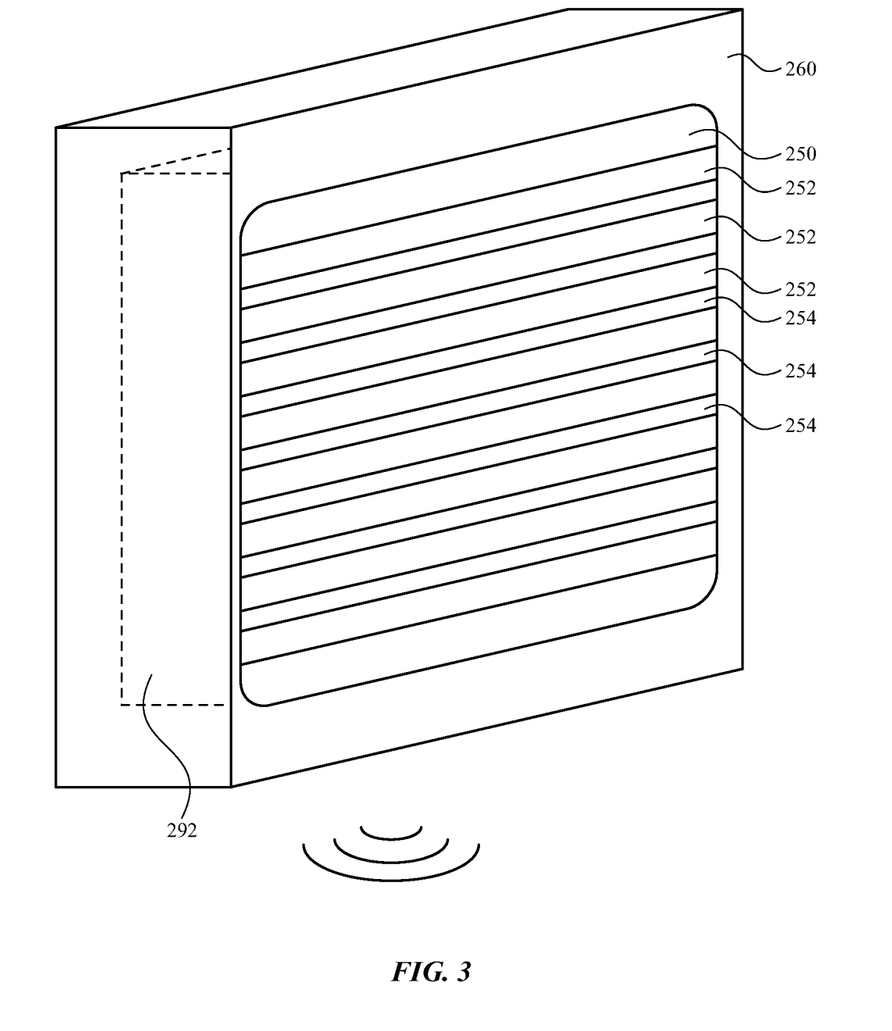
FIG. 3 illustrates a perspective view of a speaker unit of a head-mountable device, according to some embodiments of the present disclosure.

Referring to FIG. 3, a perspective view of a speaker unit is shown in accordance with some embodiments. The speaker unit 200 can include a speaker 292 that is within a housing 260. The speaker 292 may be any type of loudspeaker. For example, the speaker 292 may be a microspeaker. A microspeaker, also known as a microdriver, is a miniaturized implementation of a loudspeaker having a broad frequency range. The speaker unit 200 may have a small form factor defined by an exterior surface of a housing 260. The housing 260 can provide an opening for the emission of sound from the speaker 292.

The housing 260 can include or be coupled to a back plate 250 of the speaker 292. The back plate 250 can provide structural support to couple together and secure the components of the speaker 292, as discussed further herein. At least some of the components of the speaker 292 (e.g., a diaphragm, a surround, etc.) can be contained within the housing 260. The housing 260 and the back plate 250 can together define an outer periphery of the speaker unit 200 within which the speaker 292 is contained. Although the outer periphery is represented in FIG. 3 as having essentially a rectangular cuboid shape, the outer envelope may be other shapes (e.g., cylindrical, etc.) to facilitate placement of the speaker 292 within a corresponding internal space of the head-mountable device 100.

The back plate 250 of the speaker 292 can also provide interconnection capabilities for operably connecting other components of the head-mountable device 100 to each other. For example, the back plate 250 can include conductive strips 252 and/or insulating strips 254 extending along an exterior surface of the speaker unit 200. The conductive strips 252 can be formed as traces, wires, leads, and/or other structural elements of an electrically conductive material. The conductive strips 252 can form at least a portion of the back plate 250 to provide both structural support and electrical communication. Each of the conductive strips 252 can be separated from an adjacent one of the other conductive strips 252 by one of the insulating strips 254. Accordingly, the conductive strips 252 and/or insulating strips 254 can together form an entirety or portion of the back plate 250.

Figure 4:
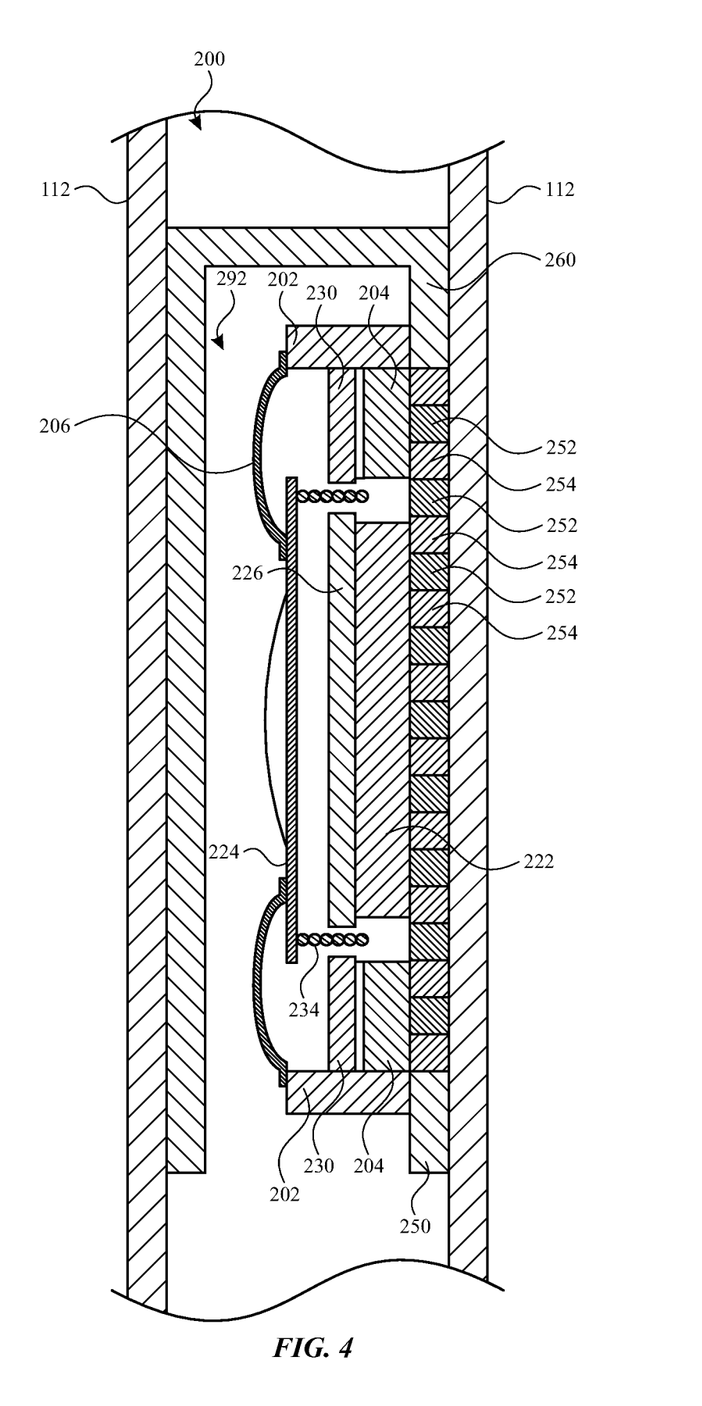
FIG. 4 illustrates sectional view of a head-mountable device taken at line A-A of FIG. 1, according to some embodiments of the present disclosure.

Referring to FIG. 4, a speaker can include an assembly that supports components thereof and provides electrical communication between other components of the head-mountable device.

As shown in FIG. 4, a magnet assembly of a speaker 292 may include several permanent magnet components and several components having high magnetic permeability. For example, the magnet assembly may include a three-magnet design in which a center magnet 222 is flanked by two side magnets 204. The center magnet 222 and/or side magnets 204 may be mounted on back plate 250. Thus, the center magnet 222 may be sandwiched between a center plate 226 and a back plate 250. Similarly, the side magnets 204 may be sandwiched between a top plate 230 and the back plate 250. The top plate 230 may laterally surround the center magnet 222 and/or the center plate 226. More particularly, top plate 230 may include an annular structure having a central opening such that the center magnet 222 and/or the center plate 226 are aligned with the central opening and the top plate 230 circumscribes center magnet 222 and center plate 226 when viewed from the top. Accordingly, the top plate 230 may be extend continuously at a constant or variable lateral distance from a center of the center magnet 222 and/or the center plate 226, e.g., over a circular or rectangular path around the center magnet 222 and/or the center plate 226. The magnets may be formed from the same or different types of permanent magnet materials, which may be any permanent magnet material known in the art. Similarly, the magnetic plates of the magnet assembly may be formed from known magnetic materials, including magnetic steel or other high permeability materials, e.g., high permeability iron-cobalt (FeCo) alloys.

In some embodiments, the arrangement of magnets and magnetic plates provide a magnetic circuit to direct a magnetic field generated by center magnet 222 and side magnets 204. The magnetic circuit may traverse center plate 226, top plate 230, and back plate 250 to form a magnetic loop. More particularly, the center magnet 222 and the side magnets 204 may be permanent magnets having respective opposite poles, and thus, the center magnet 222 may generate a magnetic field in a first direction, e.g., upward, and side magnets 204 may generate a magnetic field in an opposite direction, e.g., downward. The magnetic fields may be conveyed laterally between the magnets through the center plate 226, the top plate 230, and the back plate 250. More particularly, the magnetic field may flow laterally between the center plate 226 and the top plate 230 across an air gap there between. The gap may be an annular space around the center magnet 222, and the air gap may separate the center plate 226 from the top plate 230. Accordingly, the air gap provides a void to receive another speaker component, such as a wire coil 234.

The wire coil 234 may be disposed within the air gap of a stationary magnet assembly of speaker 292. The wire coil 234 may include numerous turns or loops wound around a former having a cross-sectional shape similar to the air gap. For example, the air gap may be a cylindrical, annular void and the former may be a cylindrical, annular tube. The former may be attached to a surround 206, and thus, the surround 206 may suspend the former and wire coil 234 within the air gap. Accordingly, by passing an electrical current through the loops of wire coil 234, a corresponding magnetic field may be produced. The corresponding magnetic field may react with the magnetic field focused in the air gap by the magnet assembly to move wire coil 234, the former, and surround 206. More particularly, a diaphragm 224 attached to the surround 206 may be moved to radiate sound from the speaker 292.

The electrical current used to drive the speaker 292 may be passed through the wire coil 234 from a first end of the coil winding to a second end of the coil winding. More particularly, the first end may be part of a first terminal of the wire coil 234 and the second end may be part of a second terminal of the wire coil 234.

The top plate may be electrically insulated from other components of the magnet assembly to prevent electrical current from straying outside of an intended electrical circuit path. For example, the top plate 230 may be supported above the back plate 250 by the frame 202, and the frame 202 may be formed from a dielectric material such as a dielectric polymer to prevent the flow of electrical current from the top plate 230 into the frame 202. The top plate 230 may also be physically supported above back plate 250 by another structural feature that separates the top plate 230 from the back plate 250. Such structural features may be formed from dielectric polymers to prevent the flow of electrical current from the top plate 230 into the back plate 250. The top plate 230 may be electrically insulated from center plate 226 and center magnet 222 by the air gap. Thus, an electrical circuit may be routed through the wire coil 234 and the top plate 230, and may be isolated from other components of the magnet assembly.

As further shown in FIG. 4, the back plate can include the conductive strips 252 and the insulating strips 254 arranged in an alternating pattern and forming at least a portion of an outer periphery of the speaker unit 200.

The conductive strips 252 can optionally be insulated from the top plate 230 and/or the center magnet 222 by an insulating material. Such a material can include the insulating strips 254 and/or another structure. Alternatively, one or more of the conductive strips 252 can be electrically connected to one or more other components of the speaker 292.

The head-securement element 112 can form a cover that extends over the back plate 250 of the speaker unit 200. For example, as shown in FIG. 4, the speaker unit 200 can reside within opposing layers of the head-securement element 112. The head-securement element 112 can be formed of one or more of a variety of materials, such as fabric, textiles, polymers, plastics, elastics, leather, and the like. It will be understood that the head-securement element 112 can separate the speaker unit 200 from an external environment while allowing sound emitted from the speaker unit 200 to reach a user's ears (e.g., via an opening in the bottom of the housing 260). The head-securement element 112 can abut at least some of the conductive strips 252 and/or the insulating strips 254 forming a portion of an outer periphery of the speaker unit 200. The head-securement element 112 can electrically insulate the conductive strips 252 on a side of the speaker unit 200.

The number, size (e.g., thickness, width, length, etc.), shape, and arrangement of conductive strips 252 and/or insulating strips 254 can vary from that illustrated in the figures. For example, any number of conductive strips 252 and/or the insulating strips 254 can be provided. The conductive strips 252 can form a portion of the back plate 250 that does not disrupt the magnetic flux through the magnets of the speaker 292.

Accordingly, embodiments of the present disclosure provide a head-mountable device with a speaker unit that provides structural support to its own components and electrical connections between other components. The arrangement of conductive strips within a back plate of a speaker unit can provide the structural support needed by the components of a speaker while allowing components on opposing sides of the speaker unit to be operably connected to each other. By providing both functions with the conductive strips of a back plate, the total space required is minimized so that the head-securement element (e.g., band) of the head-mountable device maintains a thin profile.

Various examples of aspects of the disclosure are described below as clauses for convenience. These are provided as examples, and do not limit the subject technology.

Clause A: a head-mountable device comprising: a display unit; a band for securing the display unit to a head of a user; a controller within the display unit; a speaker unit within the band, the speaker unit comprising: a center magnet; a side magnet; and a back plate coupling the center magnet to the side magnet and comprising conductive strips defining a portion of an outer periphery of the speaker unit; and a band component within the band and being operably connected to the controller by the conductive strips.

Clause B: a head-mountable device comprising: a display unit; a first component within the display unit; a head-securement element for securing the display unit to a head of a user; a second component within the head-securement element; and a speaker unit within the head-securement element, the speaker unit comprising: speaker components for generating sound; a back plate coupled to each of the speaker components for securing the speaker components relative to each other, the back plate providing an electrical connection between the first component within the display unit and the second component within the head-securement element.

Clause C: a head-mountable device comprising: a display unit; a first component within the display unit; a head-securement element for securing the display unit to a head of a user; a second component within the head-securement element; and a speaker unit within the head-securement element, the speaker unit comprising: a speaker housing defining an outer periphery of the speaker unit, the speaker housing comprising a back plate with an alternating arrangement of conductive strips and insulating strips, wherein each of the conductive strips is separated from an adjacent one of the other conductive strips by one of the insulating strips, the conductive strips operably connecting the first component to the second component; and a speaker within the speaker housing.

One or more of the above clauses can include one or more of the features described below. It is noted that any of the following clauses may be combined in any combination with each other, and placed into a respective independent clause, e.g., clause A, B, or C.

Clause 1: the display unit contains: a display screen; a camera; an eye sensor; and a microphone.

Clause 2: the speaker unit further comprises: a diaphragm opposite the back plate; and a wire coil extending from the diaphragm to between the center magnet and the side magnet.

Clause 3: the speaker unit is a first speaker unit; the back plate is a first back plate; the conductive strips are first conductive strips; the head-mountable device further comprises: a second speaker unit within the band, the second speaker unit comprising a second back plate comprising second conductive strips defining a portion of an outer periphery of the second speaker unit; and a second band component within the band and being operably connected to the controller by the second conductive strips.

Clause 4: the band is connected to a first side and a second side of the display unit.

Clause 5: the band comprises a fabric material that abuts the back plate of the speaker unit.

Clause 6: the band component comprises a battery.

Clause 7: the band component comprises a sensor.

Clause 8: the band component comprises an antenna.

As described above, one aspect of the present technology may include the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A head-mountable device comprising:
a display unit;
a band for securing the display unit to a head of a user;
a controller within the display unit;
a speaker unit within the band, the speaker unit comprising:

a center magnet;

a side magnet; and a back plate coupling the center magnet to the side magnet and comprising conductive strips defining a portion of an outer periphery of the speaker unit; and a band component within the band and being operably connected to the controller by the conductive strips.

2. The head-mountable device of claim 1, wherein the display unit contains:

a display screen;

a camera;

an eye sensor; and a microphone.

3. The head-mountable device of claim 1, wherein the speaker unit further comprises:

a diaphragm opposite the back plate; and a wire coil extending from the diaphragm to between the center magnet and the side magnet.

4. The head-mountable device of claim 1, wherein:

the speaker unit is a first speaker unit;

the back plate is a first back plate;

the conductive strips are first conductive strips;

the head-mountable device further comprises:

a second speaker unit within the band, the second speaker unit comprising a second back plate comprising second conductive strips defining a portion of an outer periphery of the second speaker unit; and a second band component within the band and being operably connected to the controller by the second conductive strips.

5. The head-mountable device of claim 1, wherein the band is connected to a first side and a second side of the display unit.

6. The head-mountable device of claim 1, wherein the band comprises a fabric material that abuts the back plate of the speaker unit.

7. The head-mountable device of claim 1, wherein the band component comprises a battery.

8. The head-mountable device of claim 1, wherein the band component comprises a sensor.

9. A head-mountable device comprising:

a display unit;

a first component within the display unit;

a head-securement element for securing the display unit to a head of a user;

a second component within the head-securement element; and a speaker unit within the head-securement element, the speaker unit comprising:

speaker components for generating sound; and a back plate coupled to each of the speaker components for securing the speaker components relative to each other, the back plate providing an electrical connection between the first component within the display unit and the second component within the head-securement element.

10. The head-mountable device of claim 9, wherein the display unit contains:

a display screen;

a camera;

an eye sensor; and a microphone.

11. The head-mountable device of claim 9, wherein the speaker components comprise:

a center magnet;

a side magnet;

a diaphragm opposite the back plate; and a wire coil extending from the diaphragm to between the center magnet and the side magnet.

12. The head-mountable device of claim 9, wherein the head-securement element is connected to a first side and a second side of the display unit.

13. The head-mountable device of claim 9, wherein the head-securement element comprises a fabric material that abuts the back plate of the speaker unit.

14. The head-mountable device of claim 9, wherein the second component comprises a battery, a sensor, or a microphone.

15. A head-mountable device comprising:

a display unit;

a first component within the display unit;

a head-securement element for securing the display unit to a head of a user;

a second component within the head-securement element; and a speaker unit within the head-securement element, the speaker unit comprising:

a speaker housing defining an outer periphery of the speaker unit, the speaker housing comprising a back plate with an alternating arrangement of conductive strips and insulating strips, wherein each of the conductive strips is separated from an adjacent one of the other conductive strips by one of the insulating strips, the conductive strips operably connecting the first component to the second component; and a speaker within the speaker housing.

16. The head-mountable device of claim 15, wherein the display unit contains:

a display screen;

a camera;

an eye sensor; and a microphone.

17. The head-mountable device of claim 15, wherein the speaker comprises:

a center magnet;

a side magnet;

a diaphragm opposite the back plate; and a wire coil extending from the diaphragm to between the center magnet and the side magnet.

18. The head-mountable device of claim 15, wherein the head-securement element is connected to a first side and a second side of the display unit.

19. The head-mountable device of claim 15, wherein the head-securement element comprises a fabric material that abuts the back plate of the speaker unit.

20. The head-mountable device of claim 15, wherein the second component comprises a battery, a sensor, or a microphone.

* * * * *